United States Patent [19]

Doto et al.

[11] Patent Number: 5,713,639
[45] Date of Patent: Feb. 3, 1998

[54] BRAKE CONTROL DEVICE FOR RAILROAD ROLLING STOCK

[75] Inventors: Shigeaki Doto; Asaji Imanaka, both of Kobe, Japan

[73] Assignee: Westinghouse Air Brake Company, Wilmerding, Pa.

[21] Appl. No.: 607,016

[22] Filed: Feb. 26, 1996

[30] Foreign Application Priority Data

May 12, 1995 [JP] Japan ..................... 7-138482

[51] Int. Cl.$^6$ ......................................... B60T 13/68
[52] U.S. Cl. ............................... 303/3; 303/128
[58] Field of Search ........................ 303/3, 7, 15–17, 303/20, 123, 124, 128; 364/424.024, 426.05

[56] References Cited

U.S. PATENT DOCUMENTS 4,624,506  11/1986  Doto ................................. 303/3
4,685,750  8/1987  Imanaka ......................... 303/3 X

*Primary Examiner*—Josie Ballato
*Attorney, Agent, or Firm*—James Ray & Associates

[57] ABSTRACT

Brake control device for railroad stock has a braking force setting unit to add a braking force command signal for a powered car and braking force command signals for trailer cars and output a composite command signal. A main control device receives such composite signal and generates an electrical braking force. A braking force computation unit splits an error in a electrical braking force equivalent command signal corresponding to an actual electrical braking force with respect to such composite command signal into a supplementary hydraulic braking force command signal for a powered car and supplementary hydraulic braking force command signals for trailer cars and outputs results to hydraulic brake devices of such cars, wherein the command signals of such trailer cars are individual car command signals obtained by splitting such command signals in rolling stock units a plurality of times. Such setting unit adds such command signal for such powered car and such plurality of individual trailer car command signals and the braking force computation unit computes and outputs a trailer car braking force load element in such electrical braking force equivalent signal as a plurality of individual trailer car braking force load signals in response to such individual car command signals and computes and outputs such supplementary hydraulic braking force command signals to such hydraulic brake devices of such cars based on the command signals in such rolling stock units for such cars and a sum of individual trailer car braking force load signals associated with such cars.

8 Claims, 5 Drawing Sheets

BRAKE CONTROL DEVICE FOR RAILROAD ROLLING STOCK

FIELD OF THE INVENTION

The present invention relates, in general, to brake control devices for railroad rolling stock and, more particularly, this invention relates to a brake device possessing the capability of utilizing matched control between electric brakes and hydraulic brakes in composite railroad rolling stock including both powered cars and trailer cars.

BACKGROUND OF THE INVENTION

As disclosed in Japanese Examined Patent Application (JP-B) Sho. 63-10024, for example, a known brake control device for composite rolling stock comprising powered cars and trailer cars is the brake control device for railroad rolling stock which outputs the value from adding the braking force command signals for rolling stock units of powered cars and trailer cars as a composite braking force command signal to a main control device (electric brake device) provided in the powered car.

This brake device is designed to use a hydraulic brake device to correct the error in the actual electrical braking force in the main control device with respect to the composite braking force command signal as a supplementary braking force command signal in rolling stock units for the powered car and trailer cars.

Additionally, this brake control device carries out what is known as delayed-insertion control whereby, when the composite braking force command signal is output, the main control device which generates a regenerative voltage is employed effectively, and the error in the electrical braking forces with respect to the composite braking force command is corrected by the hydraulic braking forces of the powered cars and trailer cars.

Now, in recent years, variable voltage variable frequency control devices (referred to as VVVF devices hereinbelow) have become the principal type of main control device with a view to achieving improvements in both the power control and the brake control. Further, among such VVVF control devices, there have been proposals for individual VVVF control devices which control various electric motors individually (see, for example, Japanese Laid Open Patent Application (JP-A) Hei. 5-276706) in order to make the wheels more controllable.

Furthermore, because these VVVF control devices have a self re-adhering feature they have the advantage that they allow the braking force applied to the wheel to be increased even though he wheel may slip when outputing the electrical braking force. Nevertheless, because the individual VVVF control device can control various electric motors individually, it allows braking control corresponding to the traction properties of the wheels associated with the electric motors, with the result that the load capacity of the electrical braking force can be increased.

Consequently, as the electrical braking force load capacity of the main brake control device increases, so is it possible to increase the regenerated voltage if the electrical braking force load taken by the main brake control device is increased, and so too is it possible, to a commensurate extent, to expect other advantages, particularly in terms of improvements in aspects such as the durability and the energy-saving properties of the hydraulic braking devices.

However, brake control devices for railroad rolling stock have problems in that, even if the situation is such that the above-mentioned individual VVVF control device is able to support a braking force which is larger than one and smaller than two trailer car units, the arrangement is such that the braking force command signals of the powered cars and the trailer cars and the composite braking force command signal which is the sum value thereof are output as a braking force command in rolling stock units and the braking force in rolling stock units is controlled, with the result that they are only able to support the braking force element for a single trailer car.

The present invention has taken such problems into account and provides a brake control device for railroad rolling stock whereby the electrical braking force of a main control device can be used effectively.

SUMMARY OF THE INVENTION

According to a first aspect, the present invention provides a brake control device for railroad rolling stock in which the brake control device includes a braking force setting part which adds the braking force command signal for the powered car and the braking force command signals for the trailer cars and outputs a composite braking force command signal. The invented brake control device includes a main control device which receives the composite braking force command signal and then generates an electrical braking force, and a supplementary braking force computation unit which splits the error in the electrical braking force equivalent command signal corresponding to the actual electrical braking force with respect to the above-mentioned composite braking force command signal into a supplementary hydraulic braking force command signal for the powered car and supplementary hydraulic braking force command signals for the trailer cars, and outputs the results to the hydraulic brake devices of the powered car and the trailer cars. According to the present invention, the braking force command signals of the above-mentioned trailer cars are individual trailer car braking force command signals obtained by splitting the braking force command signals in rolling stock units a plurality of times. The above-mentioned braking force setting part adds the braking force command signal for the powered car and the above-mentioned plurality of individual trailer car braking force command signals and the above-mentioned supplementary braking force computation unit computes and outputs the trailer car braking force load element in the above-mentioned electrical braking force equivalent signal as a plurality of individual trailer car braking force load signals in response to the above-mentioned individual trailer car braking force command signals. Such supplementary braking force computation unit, additionally, computes and outputs supplementary hydraulic braking force command signals to the hydraulic brake devices of the trailer cars based on the above-mentioned braking force command signals in rolling stock units of the trailer cars and the sum of the above-mentioned individual trailer car braking force load signals belonging to the trailer cars.

Additionally, according to a second aspect of the invention, there is provided a brake control device for railroad rolling stock having a braking force setting part which adds the braking force command signal for the powered car and the braking force command signals for the trailer cars and outputs a composite braking force command signal. In this embodiment the brake control device also includes a main control device which receives the composite braking force command signal and generates an electrical braking force and a supplementary braking force computation unit which splits the error in the electrical braking force equivalent command signal corresponding to the actual electrical braking force with respect to the above-mentioned composite braking force command signal into a supplementary hydraulic braking force command signal for the powered car and supplementary hydraulic braking force command signals for the trailer cars. Such supplementary braking force computation unit outputs the results to the hydraulic brake devices of the powered car and the trailer cars. In this embodiment of the invention, the braking force command signals of the above-mentioned trailer cars are one or a plurality of individual trailer car braking force command signals selected from: a braking force command signal in rolling stock units corresponding to any desired trailer car, and an individual trailer car braking force command signal obtained by splitting a braking force command signal in rolling stock units a plurality of times corresponding to another trailer car. Further, the above-mentioned braking force setting part adds the selected one or plurality of individual trailer car braking force command signals for the other trailer car and the braking force command signal in rolling stock units for the above-mentioned desired trailer car and the braking force command signal of the powered car and the above-mentioned supplementary braking force computation unit outputs the trailer car braking force load element in the above-mentioned electrical braking force equivalent signal as a braking force load signal in rolling stock units for the desired trailer car and the one or plurality of individual trailer car braking force load signals for the other trailer car in response to the braking force command signal in rolling stock units for the above-mentioned trailer car and the individual trailer car braking force command signals. In addition, outputs representing supplementary hydraulic braking force command signals to the hydraulic brake device of the above-mentioned desired trailer cars based on the braking force command signal in rolling stock units for this trailer car and the above-mentioned braking force load signal in rolling stock units are provided. The supplementary braking force computation unit computes and outputs the supplementary hydraulic braking force command signal in rolling stock units to the above-mentioned hydraulic brake device of the other trailer car based on the braking force command signal in rolling stock units of that trailer car and the sum of the above-mentioned individual trailer car braking force load signals belonging to the trailer car.

In a third aspect, the present invention provides a brake device wherein the individual trailer car braking force command signal split a plurality of times involves splitting a braking force command signal in rolling stock units into bogie units or axle units corresponding to the number of bogies or the number of axles.

In a fourth and final aspect, the present invention provides a brake device wherein the above-mentioned main control device has independent control functions whereby it controls the electrical braking forces for each electric motor provided in a bogie unit or in axle units.

OBJECTS OF THE INVENTION

It is, therefore, one of the primary objects of the present invention to provide a brake control device for railway applications which is highly reliable.

Another object of the present invention is to provide a brake control device for railway applications which can be easily retrofitted to existing railway cars.

Still another object of the present invention is to provide a brake control device for railway applications which is highly efficient.

In addition to the specific objects and advantages of the brake control device described above, various other objects and advantages of the present invention will become more readily apparent to those persons who are skilled in the railway brake control art from the following more detailed description of the invention, particularly, when such detailed description is taken in conjunction with the attached drawing figures and with the appended claims.

Figure 1:
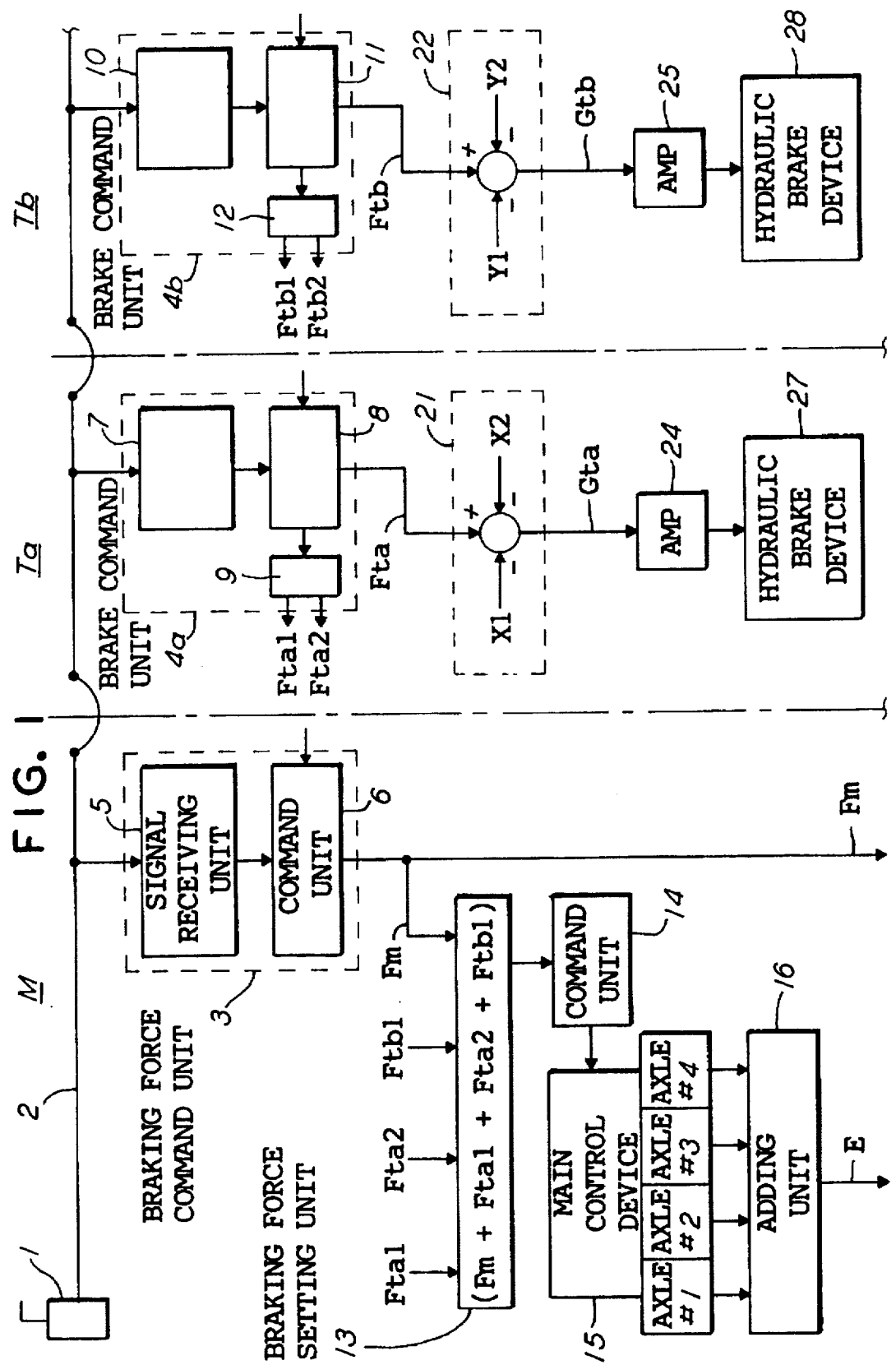
FIG. 1 is a block diagram which illustrates the top half of a configuration of the brake control device for railroad rolling stock according to a first embodiment of the present invention.

DETAILED DESCRIPTION OF THE DRAWINGS AND PRESENTLY PREFERRED EMBODIMENT OF THE INVENTION

Prior to proceeding to the more detailed description of the present invention it should be noted that, for the sake of clarity and understanding of the invention, identical components having identical functions have been identified with identical reference numerals throughout the several views illustrated in the drawings.

Figure 2:
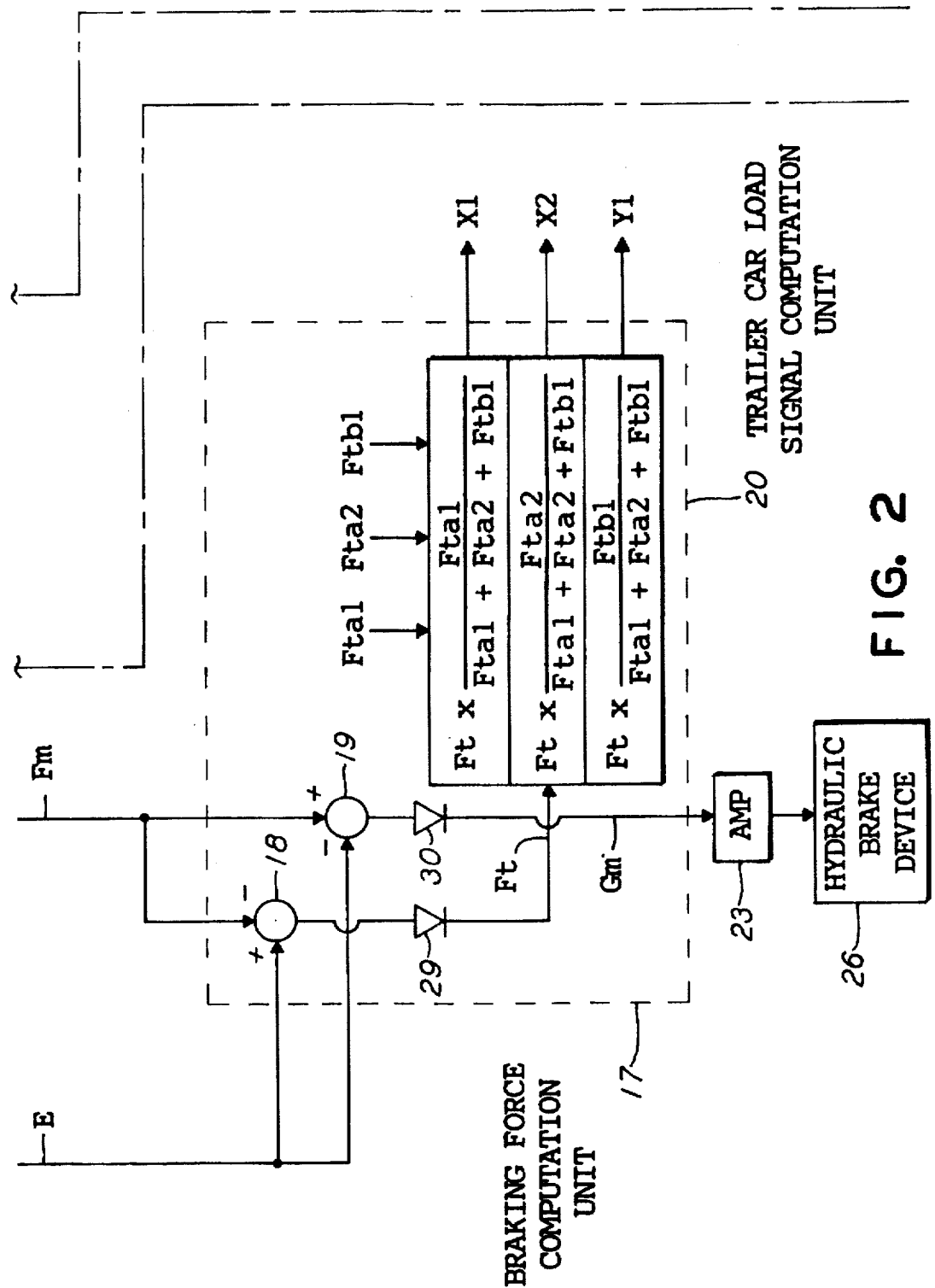
FIG. 2 is a block diagram which illustrates the bottom half of a configuration of the brake control device for railroad rolling stock according to such first embodiment of the present invention.

An embodiment of the present invention will now be described below with particular reference to the figures. FIG. 1 and FIG. 2 are block diagrams which illustrate the configuration of the brake control device for railroad rolling stock according to a first embodiment.

The configuration is explained first using FIG. 1 and FIG. 2. FIG. 1 and FIG. 2 show components in a single powered car M and two trailer cars Ta and Tb in a composite rolling stock unit comprising a powered car and trailer cars.

In this embodiment, a brake command unit 1 is provided from which brake commands are output via a command line 2 to braking force command units 3, 4a and 4b provided in the various cars. The braking force command unit 3 provided in the powered car has a signal-receiving unit 5 which subjects the above-mentioned brake command to digital/analog conversion, and a command unit 6 which adds the applied load signal for the powered car to this converted brake signal and outputs a rolling stock unit powered car braking force command signal Fm.

Meanwhile, the braking force command units 4a and 4b in the trailer cars Ta and Tb respectively have signal-receiving units 7 and 10 which subject the above-mentioned brake command to digital/analog conversion, and command units 8 and 11 which add the applied load signals for the trailer cars Ta and Tb to the converted brake signals and output trailer car braking force command signals Fta and Ftb respectively, and also respectively have splitting units 9 and 12 which respectively split the rolling stock unit trailer car braking force command signals Fta and Ftb in ½ corresponding to the number of bogies (2) and output them as individual trailer car braking force command signals Fta1, Fta2, Ftb1 and Ftb2 respectively.

The reason for splitting the trailer car braking force command signal here is to reduce the trailer car braking force command signal output unit and so make it possible to output a braking force command signal sum corresponding more closely to the electrical braking force which can be borne by a main control device 15 which is discussed hereinbelow. Thus, the number of splits may correspond to the number of axles (normally 4 splits) in addition to the number of bogies discussed hereinabove, or the signal may be split any desired number of times.

A composite braking force setting unit 13 is provided, which adds the powered car braking force command signal Fm and the individual trailer car braking force command signals Fta1, Fta2 and Ftb1 to compute and output a composite braking force command signal. It will be noted that the individual trailer car braking force command signal Ftb2 of the trailer car Tb is output to the composite braking force setting unit of another powered car which is not depicted. A command unit 14 is provided, which outputs an electrical control command based on the above-mentioned composite braking force command signal.

There is a main control device 15 which produces an electrical braking force corresponding to the above-mentioned electrical control command and outputs electrical braking force equivalent signals equivalent to the electrical braking force which is actually generated. This main control device 15 is an individual VVVF control device which controls the electrical braking forces of electric motors provided on each axle unit of 1 to 4 axles and it is arranged in such a way that the above-mentioned electrical braking force equivalent signals are also output to each axle and the electrical braking force equivalent signals for each of these axles are added in an adding unit 16 and then output as a total electrical braking force equivalent signal E.

A supplementary braking force computation unit 17, having subtraction units 18 and 19, diodes 29 and 30, and a trailer car load signal computation part 20 is also provided. In the subtraction unit 19, in this embodiment of the invention, the total electrical braking force equivalent signal E is subtracted from the powered car braking force command signal Fm, and the result of this subtraction is output as a powered car supplementary hydraulic braking force command signal Gm, via the diode 30 and an amplifier unit 23, to a powered car hydraulic brake device 26.

Consequently, when the powered car braking force command signal Fm is greater than the total electrical braking force equivalent signal E, in other words when the electrical braking force is not supplying the powered car braking force, the powered car supplementary hydraulic braking force command signal Gm is output, and the error therein is corrected by the hydraulic brake device 26.

Meanwhile, in the subtraction unit 18, the powered car braking force command signal Fm is subtracted from the total electrical braking force equivalent signal E, and the result of this subtraction is output as a total trailer car load signal Ft, via the diode 29, to such trailer car load signal computation unit 20.

Consequently, when the total electrical braking force equivalent signal E is greater than the powered car braking force command signal Fm, in other words when the electrical braking force is supplying the powered car braking force, the total trailer car load signal Ft is output, and the braking forces for the trailer cars are borne by the surplus portion of the electrical braking force.

Further, in the trailer car load signal computation unit 20, the total trailer car load signal Ft is made proportional to the sizes of the individual trailer car braking force command signals Fta1, Fta2 and Ftb1, split and output as the individual trailer car load signals X1, X2 and Y1.

There is a trailer car supplementary braking force computation unit 21 for the trailer car Ta, arranged in such a way that the sum of the above-mentioned individual trailer car load signals X1 and X2 is subtracted from the trailer car braking force command signal Fta in a subtraction unit, and the result of this subtraction is output as a supplementary hydraulic braking force command signal Gta for the trailer car Ta, via an amplifier unit 24, to a hydraulic brake device 27.

Consequently, the braking force for the trailer car Ta is borne by the surplus electrical braking force supplying the powered car braking force mentioned above, and, when this electrical braking force is insufficient with respect to the braking force of the trailer car Ta, this is supplemented by the hydraulic braking force of the hydraulic brake device 27.

There is also a trailer car supplementary braking force computation unit 22 for the trailer car Tb: the sum of the above-mentioned individual trailer car load signal Y1 and an individual trailer car load signal Y2, computed in the same way as described above in another powered car, is subtracted from the trailer car braking force command signal Ftb in a subtraction unit and the result of this subtraction is output as a supplementary hydraulic braking force command signal Gtb for the trailer car Tb, via an amplifier unit 25, to a hydraulic brake device 28.

Consequently, as well as the trailer car Ta, half of the braking force of the trailer car Tb in addition is borne by the surplus electrical braking force supplying the powered car braking force mentioned above. Also, the arrangement is such that when the sum of the electrical braking force and the remaining half of the electrical braking force from the other powered car is deficient with respect to the braking force of the trailer car Ta, this error is corrected by the hydraulic braking force of the hydraulic brake device 28.

Also, because the supplementary hydraulic braking force command signals Gta and Gtb of the trailer cars Ta and Tb are output in rolling stock units to the hydraulic brake devices 27 and 28 of the trailer cars to which they belong, as discussed hereinabove, it follows that the error in the electrical braking force with respect to the composite braking force command signal can be corrected by the hydraulic brake devices 27 and 28 in rolling stock units in the same way as hitherto, and an increase in the number of components is avoided.

It will be noted that because, in the trailer car Ta in the configuration discussed above, all the individual trailer car braking force command signals Fta1 and Fta2 are borne by the main command device 15 of the powered car M, one may also adopt a configuration whereby only the braking force command signal Fta in rolling stock units is output, as has been the case hitherto, without any such splitting.

The operation of a brake control device configured as described above is now described. Now, when the brake command is output from the brake command unit 1, based on this brake command, a rolling stock unit powered car braking force command signal Fm is output from the braking force command unit 3 in the powered car, individual trailer car braking force command signals Fta1 and Fta2 split in two are output from the braking force command unit 4 in the trailer car Ta, and individual trailer car braking force command signals Ftb1 and Ftb2 split in two are output from the braking force command unit 5 in the trailer car Tb.

Also, in the composite braking force setting unit 13, these powered car braking force command signals Fm and the individual trailer car braking force command signals Fta1, Fta2 and Ftb1 are added and output as a composite braking force command signal, via the command unit 14, to the main control device 15.

Meanwhile, the other individual trailer car braking force command signal Ftb2 of the trailer car Tb is output to the composite braking force setting unit of another powered car and processed in the same way as discussed hereinbelow. In the main control device 15, based on the above-mentioned composite braking force command signal, an electrical braking force is output and a total electrical braking force equivalent signal E, equivalent to the electrical braking force actually generated, is output to the supplementary braking force computation part 17.

When the total electrical braking force equivalent signal E is less than the powered car braking force command signal Fm in the supplementary braking force computation unit 17, the difference is output as a supplementary hydraulic braking force command signal Gm to the hydraulic brake device 26. In other words, when the electrical braking force produced is not supplying the braking force needed by the powered car, the electrical braking force is split, giving priority to the powered car, and the error is corrected by the hydraulic braking force of the hydraulic brake device 26.

When the total electrical braking force equivalent signal E is greater than the powered car braking force command signal Fm, the difference is made proportional to the magnitudes of the individual trailer car braking force command signals Fta1, Fta2 and Ftb1, split and respectively output as the individual trailer car load signals X1, X2 and Y1 to the supplementary braking force computation units 21 and 22 of the trailer cars Ta and Tb. In other words, when the electrical braking force produced is supplying the braking force required by the powered car, the braking force required by the trailer cars Ta and Tb is borne by this surplus portion.

In the supplementary braking force computation unit 21 of the trailer car Ta, the sum of the two individual trailer car load signals X1 and X2 associated with this trailer car Ta is subtracted from the trailer car braking force command signal Fta of the trailer car Ta and the difference is output as the supplementary hydraulic command signal Gta to the hydraulic brake device 27.

Meanwhile, in the supplementary braking force computation unit 22 of the trailer car Tb, the sum of the individual trailer car load signal Y1 belonging to the trailer car Ta and an individual trailer car load signal Y2 from another powered car is subtracted from the trailer car braking force command signal Ftb of the trailer car Tb and the difference is output as the supplementary hydraulic braking force command signal Gtb to the hydraulic brake device 27.

In other words, when the electrical braking force split between the trailer cars Ta and Tb is deficient with respect to the braking force required by the trailer cars Ta and Tb, the deficient portion is supplemented by the hydraulic braking forces of the hydraulic brake devices 27 and 28.

Consequently, the electrical braking force produced by the powered car M is used fully in the trailer cars Ta and Tb. And, as discussed hereinabove, an electrical braking force is used in the trailer car Tb by combining the portion produced in another powered car. In the past, because the braking force command signal of the trailer car has been output in rolling stock units, an electrical braking force able to be produced by the main control device 15 has been able to supply the braking force element for one trailer car (Ta), but it has proved possible to use the portion for only one vehicle (Ta) when it has not been possible to supply an element for two vehicles (Ta and Tb). Consequently, with the brake control device of the present invention, the electrical brake load capacity of the main control device 15 can be used more effectively than in the past. Also, when a configuration such as the above is adopted, it is possible to maintain redundancy whereby the trailer cars Ta and Tb can apply their own hydraulic brakes independently even when an accident happens to the mass-receiving units (braking force command unit 3, composite brake setting unit 13 and supplementary braking force computation unit 17) of the powered car M.

Further, because, as discussed hereinabove, when the main control device 15 is a VVVF control device which has individual control functions, even though a wheel on the powered car M may slip, due to the electrical braking force, the remaining electrical braking force is maintained simply by reducing the electrical braking force of the electric motor with which that wheel is associated. In this manner, the result is that the load proportion of the electrical braking force can be substantial, and the load proportion of the braking force portion of the trailers Ta and Tb can be increased.

Figure 3:
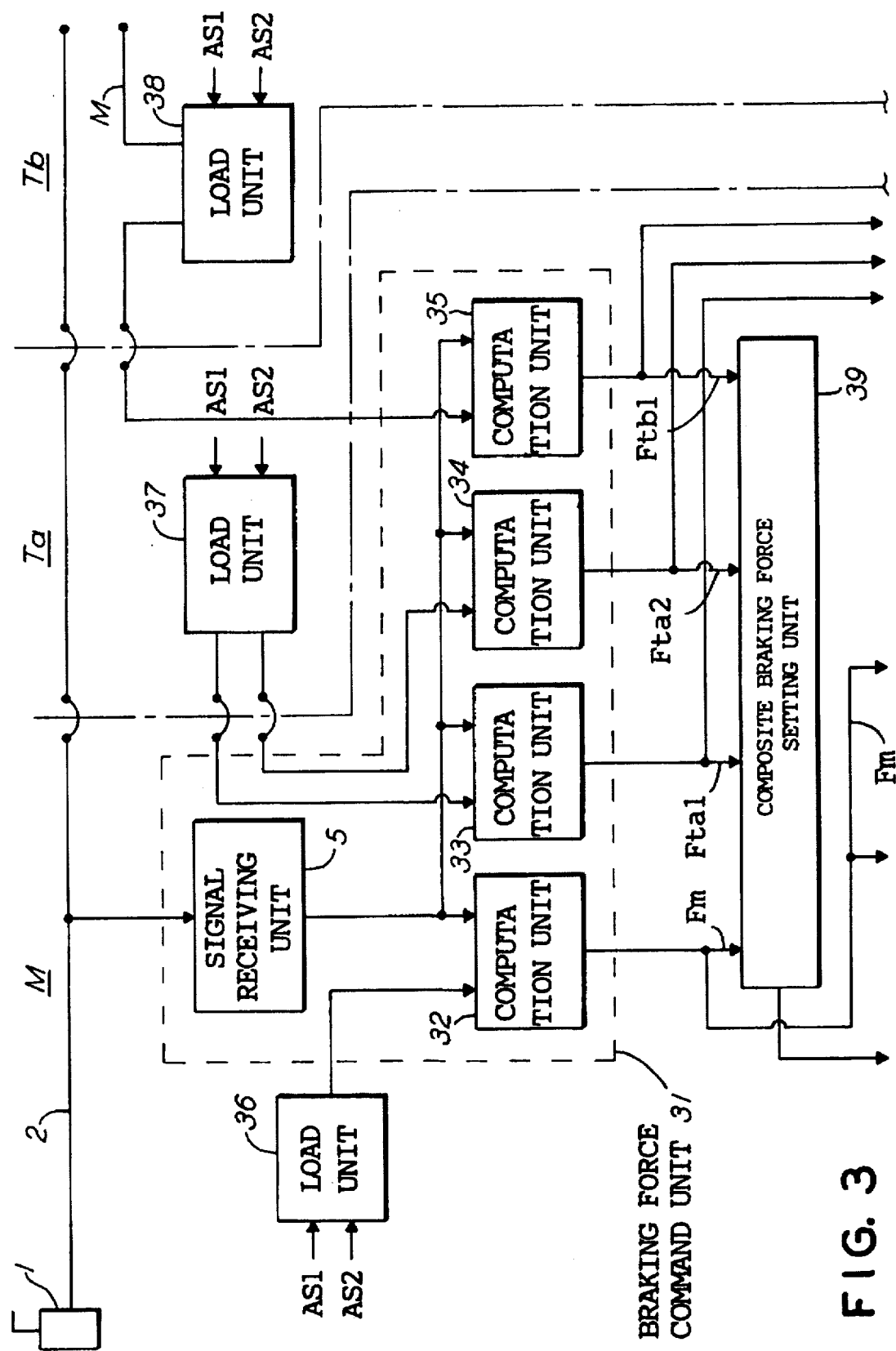
FIG. 3 is a block diagram which illustrates the top half of a configuration of the brake control device for railroad rolling stock according to a second embodiment of the present invention.
Figure 4:
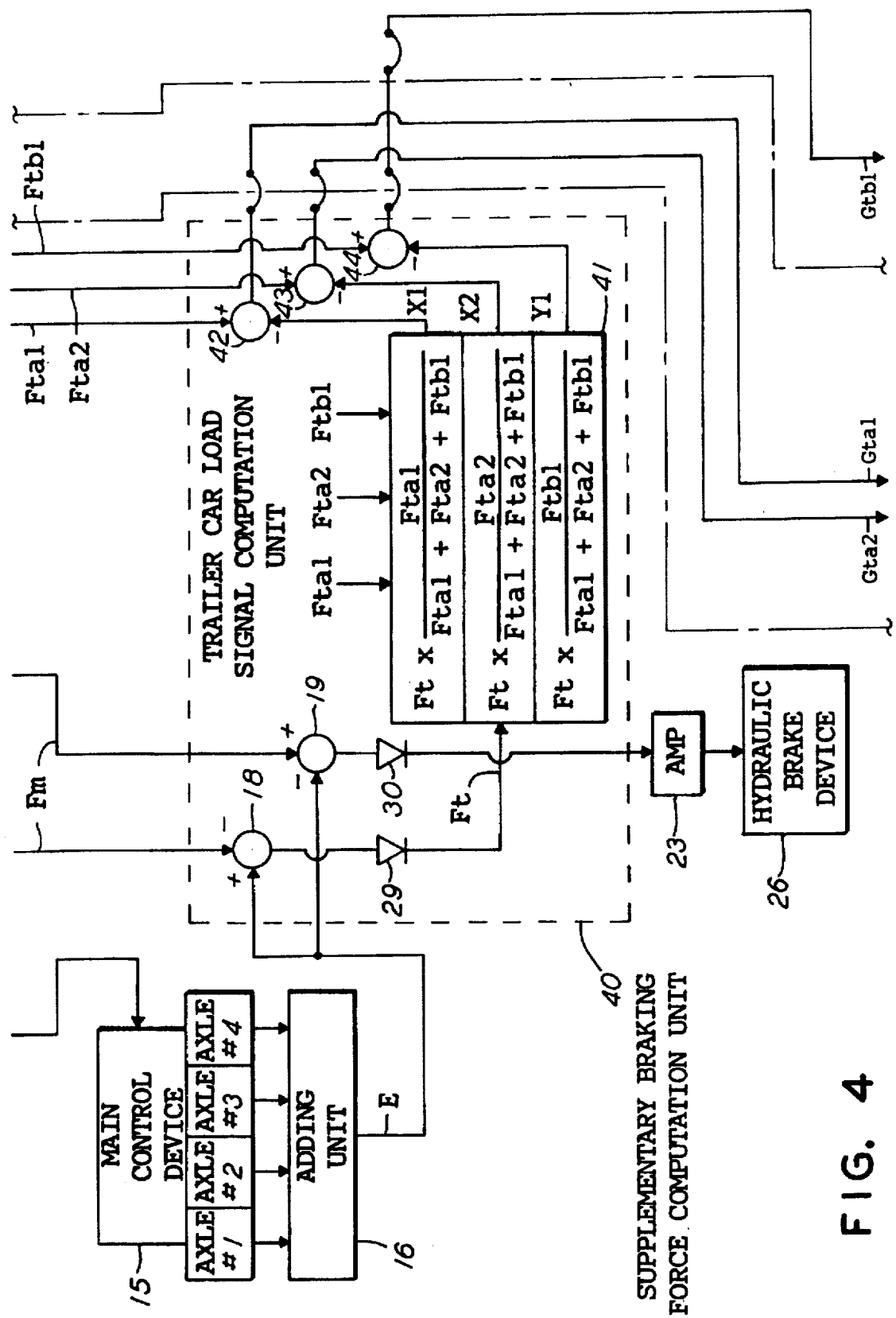
FIG. 4 is a block diagram which illustrates the bottom half of a configuration of the brake control device for railroad rolling stock according to such second embodiment of the present invention.
Figure 5:
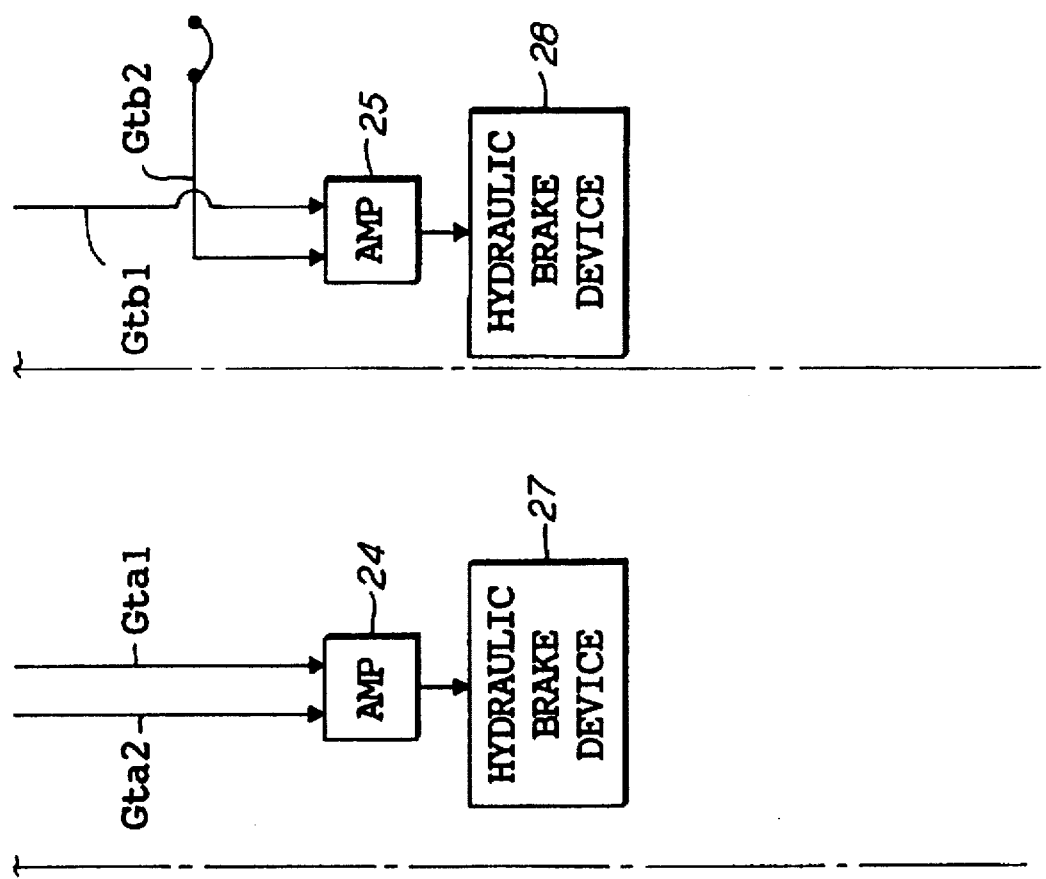

FIG. 3 and FIG. 4 are block diagrams which illustrate the configuration of a brake control device for railroad rolling stock according to an alternative second embodiment. In FIG. 3 and FIG. 4 the main point of difference to the embodiment shown in FIG. 1 and FIG. 2 is that the trailer car braking force command units 4a and 4b and the supplementary braking force computation units 21 and 22 are all provided in the powered car.

More specifically, one braking force command unit 31 is provided in the powered car and provided in the braking force command unit 31 are a signal-receiving unit 5, and braking force computation units 32 to 35 which add applied load signals to the brake command from the signal-receiving unit 5 to compute and output respective braking force command signals.

Still more specifically, the powered car braking force computation unit 32 outputs a powered car braking force command signal Fm based on the applied load signal from the applied load unit 36. Here, a front bogie load AS1 and rear bogie load AS2 in the bogie units are input to the applied load unit 36 and the applied load unit 36 combines the two and outputs an applied load signal. Also, the front and rear bogie loads AS1 and AS2 of the trailer car Ta are input to the applied load unit 37 of the trailer car Ta and the applied load unit 37 outputs applied load signals in such bogie units based on this.

Also, the Ta1 bogie braking force computation unit 33 and the Ta2 bogie braking force computation unit 34, respectively, output individual trailer car braking force command signals Fta1 and Fta2 based on the applied load signals in such bogie units. Further, the front and rear bogie loads AS1 and AS2 of trailer car Tb are also input to the applied load unit 38 of the trailer car TB and the applied load unit 38 outputs an applied load signal in such bogie units based on this.

Further, the Tb1 bogie braking force computation unit 35 outputs an individual trailer car braking force command signal Ftb1 using the applied load signal based on the front bogie load AS1. It will be noted that the applied load signal based on the rear bogie load AS2 is output to another powered car. Also, the braking force command signals Fm, Fta1, Fta2 and Ftb1 are added in the composite braking force setting unit 39 and output to the main control device 15.

Meanwhile, a single supplementary braking force computation unit 40 is provided in the powered car and the supplementary braking force computation unit 40 is provided with subtraction units 18 and 19, diodes 29 and 30, and a trailer car load signal computation unit 41, as in FIG. 1 and FIG. 2, as well as subtraction units 42 through 44. Also, in the trailer car load signal computation unit 41, a proportioning process is carried out relative to the magnitudes of the individual trailer car braking force command signals Fta1, Fta2 and Ftb1 in such bogie units before outputing individual trailer car load signals X1, X2 and Y1.

The differences between these individual trailer car load signals X1, X2 and Y1 and the individual trailer car braking force command signals Fta1, Fta2 and Ftb1 are computed in the computation units 42 through 44 and the differences are, respectively, output as supplementary hydraulic braking force command signals Gta1, Gta2 and Gtb1.

Also, in the trailer car Ta, the supplementary hydraulic braking force command signals Gta1 and Gta2 belonging to the trailer car Ta are input together via the amplification unit 24 to the hydraulic brake device 27, while in the trailer car Tb, the supplementary hydraulic braking force command signal Gtb1 belonging to the trailer car Tb is input, together with the supplementary hydraulic braking force command signal Gta2 from another powered car, via the amplification unit 25 to the hydraulic brake device 28.

Using such a configuration, the electrical braking force can be used more appropriately since the individual trailer car braking force command signals Fta1, Fta2 and Ftb1 are output corresponding to the bogie loads in the trailer cars Ta and Tb, and the electrical braking force produced in the main control device 15 is used corresponding to the individual trailer car braking force command signals Fta1, Fta2 and Ftb1.

Consequently, it is possible to set braking force load proportions which are suited to the main control device in the powered car, in response to the proportions in the composition of the powered cars and trailer cars in the composite rolling stock. Further, one can simplify the rigging on the trailer cars Ta and Tb in particular because the computation unit is consolidated in the powered car M.

It will be noted that because, for the trailer car Ta, all the individual trailer car braking force command signals Fta1 and Fta2 are borne by the main control device 15 in the powered car M, as in FIG. 1 and FIG. 2, with the configuration in which the trailer car Ta outputs an applied load signal in rolling stock units as has been the case hitherto, and the braking force command signal of the trailer car Ta in rolling stock units is computed and output by the braking force command unit 31 of the powered car.

Further, the trailer car Tb may also have a configuration in which the applied load signal in rolling stock units is simply output to the powered car M and another powered car which is not depicted, the braking force command signal in rolling stock units for the trailer car Tb is first computed by the braking force command units of the powered cars, and the braking force command signal is split corresponding to the load proportions.

Because, according to the configuration in the first embodiment, the brake control device for railroad rolling stock according to the present invention outputs the braking force command signal for the trailer cars to the braking force setting unit of the powered car after having split it into a plurality of parts, as described hereinabove, it follows that the composite braking force command signal can be output as a braking force command signal corresponding to the braking force which the main control device is able to bear and not a braking force command signal in rolling stock units and the electrical braking force of the main control device can be used all the more effectively to a commensurate extent.

As a result, one can reduce the proportion of powered cars in the composite rolling stock, which makes it possible to expect energy savings and simplified maintenance. Further, because the supplementary hydraulic braking force command signal for a trailer car is output to the hydraulic brake device belonging to that trailer car in rolling stock units, it follows that one can correct the error in the electrical braking force with respect to the composite braking force command signal using a hydraulic brake device in rolling stock units as has been the case hitherto, there is no need to provide a hydraulic brake device for each trailer car individual braking force command signal unit and an increase in the number of components can be avoided.

Because, according to the configuration in the second embodiment, the braking force command signal for the trailer car borne by the main control device in rolling stock units and the braking force load signal are computed and output in rolling stock units as has been the case previously, it follows that any increase in rigging lines can be prevented to a commensurate extent.

In addition, when the braking force command signal for a trailer car is output as an individual trailer car braking force command signal in rolling stock units or in bogie units, it is possible to set a braking force load proportion appropriate to the main control devices in the powered cars, in response to the proportions in the composition of the powered cars and trailer cars in the composite rolling stock.

Accordingly, when the main control device has individual control functions, even though a wheel on the powered car may slip, due to the electrical braking force, the remaining electrical braking force is maintained simply by reducing the electrical braking force of the electric motor with which that wheel is associated, the result is that the load capacity of the electrical braking force can be substantial and the load proportion in the above-mentioned trailer car braking force element can be increased.

From the above description it is evident that the present invention provides in a first embodiment, a configuration in which the individual trailer car braking force command signals obtained by splitting the braking force command signal for the trailer car a plurality of times to the braking force setting unit of the powered car, it follows that the composite braking force command signal can be output as the sum of braking force command signals corresponding to the braking force which the main control device is able to bear and not the sum of braking force command signals in rolling stock units and the electrical braking force of the main control device can be used all the more effectively to a commensurate extent. Further, because the supplementary hydraulic braking force command signal for a trailer car is output to the hydraulic brake device belonging to that trailer car as a signal in rolling stock units, it follows that one can correct the error in the electrical braking force with respect to the composite braking force command signal using a hydraulic brake device in rolling stock units as has been the case hitherto, and any increase in the number of components can be avoided.

Additionally, it can be seen that the present invention provides, n a second embodiment, a configuration such that the braking force command signal for the trailer car borne by the main control device in rolling stock units and the braking force load signal are computed and output in rolling stock units as has been the case previously, it follows that any increase in rigging lines can be prevented to a commensurate extent.

Additionally, when a configuration is adopted in which the individual trailer car braking force command signal is output as a signal split into rolling stock units or bogie units, it is possible to set a braking force load proportion appropriate to the main control devices in the powered cars, in response to the proportions in the composition of the powered cars and trailer cars in the composite rolling stock.

Finally, when the main control device has individual control functions, even though a wheel on the powered car may slip, due to the electrical braking force, the remaining electrical braking force is maintained simply by reducing the electrical braking force of the electric motor to which that wheel belongs, the result is that the load capacity of the electrical braking force can be substantial and the load element in the above-mentioned trailer car braking force element can be increased.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiments shown and described, but should be accorded the full scope and protection of the appended claims.

We claim:

1. A brake control device for railroad rolling stock, said brake control device comprising:
   (a) a braking force setting means engageable on such rolling stock for adding a brake braking force command signal for a powered car and braking force command signals for trailer cars and outputing a composite braking force command signal;
   (b) a main control device connected to receive said composite braking force command signal and generate an electrical braking force; and
   (c) a supplementary braking force computation unit which splits an error in a electrical braking force equivalent command signal corresponding to an actual electrical braking force with respect to said composite braking force command signal into a supplementary hydraulic braking force command signal for a powered car and supplementary hydraulic braking force command signals for trailer cars, and outputs results to hydraulic brake devices of such powered car and such trailer cars; wherein;
   (i) said braking force command signals of such trailer cars are individual trailer car braking force command signals obtained by splitting said braking force command signals in rolling stock units a plurality of times,
   (ii) said braking force setting means adds said braking force command signal for said powered car and said plurality of individual trailer car braking force command signals, and
   (iii) said supplementary braking force computation unit computes and outputs a trailer car braking force load signal in said electrical braking force equivalent signal as a plurality of individual trailer car braking force load signals in response to said individual trailer car braking force command signals and computes and outputs said supplementary hydraulic braking force command signals to such hydraulic brake devices of such trailer cars based on said braking force command signals in said rolling stock units for said trailer cars, and a sum of said individual trailer car braking force load signals associated with said trailer cars.

2. A brake control device for railroad rolling stock, as claimed in claim 1, wherein said individual trailer car braking force signal splitting a plurality of times involves splitting a braking force command signal in rolling stock units into bogie units corresponding to a number of bogies on said trailer car.

3. A brake control device for railroad rolling stock, as claimed in claim 1, wherein said individual trailer car braking force signal splitting a plurality of times involves splitting a braking force command signal in rolling stock units into axle units corresponding to a number of axles on said trailer car.

4. A brake control device for railroad rolling stock, as claimed in claim 1, wherein said main control device has independent control functions, whereby said control device controls electrical braking forces for each bogie unit.

5. A brake control device for railroad rolling stock, as claimed in claim 1, wherein said main control device has independent control functions, whereby said control device controls electrical braking forces for each axle unit.

6. A brake control device for railroad rolling stock, said brake control device comprising:
   (a) a braking force setting means which adds a brake braking force command signal for a powered car and braking force command signals for trailer cars for outputing a composite braking force command signal;
   (b) a main control device connected to receive said composite braking force signal and generate an electrical braking force;
   (c) a supplementary braking force computation unit which splits an error in an electrical braking force equivalent command signal corresponding to an actual electrical braking force with respect to said composite braking force command signal into a supplementary hydraulic braking force command signal for said powered car and supplementary hydraulic braking force command signals for said trailer cars and outputs results to hydraulic brake devices of said powered car and said trailer cars; wherein;
   (i) said braking force command signals of said trailer cars are one of said plurality of individual trailer car braking force command signals selected from: a braking force command signal in rolling stock units corresponding to any desired trailer car and an individual trailer car braking force command signal obtained by splitting a braking force command signal in rolling stock units a plurality of times corresponding to another trailer car,
   (ii) said braking force setting means adding a selected one or a plurality of individual trailer car braking force command signals for another trailer car and said braking force command signal in rolling stock units for said desired trailer car and said braking force command signal of said powered car, and
   (iii) said supplementary braking force computation unit outputs a trailer car braking force load element in said electrical braking force equivalent signal as a braking force load signal in rolling stock units for said desired trailer car and said one or plurality of individual trailer car braking force load signals for another trailer car in response to said braking force command signal in rolling stock units for said trailer car and said individual trailer car braking force command signals and outputs supplementary hydraulic braking force command signals to said hydraulic brake device of said desired trailer cars based on said braking force command signal in rolling stock units for this trailer car and said braking force load signal in rolling stock units, and computes and outputs said supplementary hydraulic braking force command signal in rolling stock units to said hydraulic brake device of such another trailer car based on a braking force command signal in rolling stock units of that trailer car and a sum of said individual trailer car braking force load signals belonging to said trailer car.

7. A brake control device for railroad rolling stock, as claimed in claim 6, wherein said main control device has independent control functions, whereby said control device controls electrical braking forces for each bogie unit.

8. A brake control device for railroad rolling stock, as claimed in claim 6, wherein said main control device has independent control functions, whereby said control device controls electrical braking forces for each axle unit.

* * * * *

UNITED STATES PATENT AND TRADEMARK OFFICE
CERTIFICATE OF CORRECTION

PATENT NO. : 5,713,639
DATED : February 3, 1998
INVENTOR(S) : Shigeaki Doto, et al.

It is certified that error appears in the above-identified patent and that said Letters Patent is hereby corrected as shown below:

Column 1, line 51, please delete "he" and insert --the--;

column 1, line 59, please delete "so is it" and insert --it is--.

Column 10, line 65, please delete "n" and insert --in--.

Signed and Sealed this

Twenty-eighth Day of July, 1998

Attest:

BRUCE LEHMAN

*Attesting Officer*  *Commissioner of Patents and Trademarks*